(12) United States Patent
Barsness et al.

(10) Patent No.: US 8,738,601 B2
(45) Date of Patent: *May 27, 2014

(54) STRING SEARCHES IN A COMPUTER DATABASE

(71) Applicant: International Business Machines Corporation, Armonk, NY (US)

(72) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,566

(22) Filed: Feb. 21, 2013

(65) Prior Publication Data

US 2013/0166533 A1  Jun. 27, 2013

Related U.S. Application Data

(63) Continuation of application No. 11/972,848, filed on Jan. 11, 2008.

(51) Int. Cl.
*G06F 17/30* (2006.01)
(52) U.S. Cl.
USPC .......................................... 707/706; 707/713
(58) Field of Classification Search
USPC .................................. 707/706, 713
See application file for complete search history.

(56) References Cited

U.S. PATENT DOCUMENTS

| | | | |
|---|---|---|---|
| 6,516,312 B1 * | 2/2003 | Kraft et al. | 707/610 |
| 6,671,681 B1 * | 12/2003 | Emens et al. | 707/706 |
| 6,681,217 B1 * | 1/2004 | Lewak | 707/706 |
| 7,266,545 B2 * | 9/2007 | Bergman et al. | 707/706 |
| 2008/0010256 A1 * | 1/2008 | Lindblad et al. | 707/3 |
| 2008/0065617 A1 * | 3/2008 | Burke et al. | 707/5 |
| 2008/0215582 A1 * | 9/2008 | Abdo et al. | 707/6 |
| 2009/0037372 A1 * | 2/2009 | Barsness et al. | 707/2 |
| 2013/0166532 A1 * | 6/2013 | Barsness et al. | 707/713 |
| 2013/0166533 A1 * | 6/2013 | Barsness et al. | 707/713 |
| 2013/0246242 A1 * | 9/2013 | Geller et al. | 705/37 |

* cited by examiner

*Primary Examiner* — Kim Nguyen
(74) *Attorney, Agent, or Firm* — Martin & Associates, LLC; Bret J. Petersen

(57) ABSTRACT

A query optimizer improves string searches in a computer database that sequentially search for a string in a database record. The query optimizer optimizes the query to search records of a database from a specified start position other than the beginning of the record. The specified start position of the search may be determined by from historical information stored from previous searches. Alternatively, the query optimizer determines the specified start position of the search based on an overriding starting position provided by a system administrator. The query optimizer may also direct that the database record be reorganized to more efficiently search for strings in the record.

9 Claims, 7 Drawing Sheets

STRING SEARCHES IN A COMPUTER DATABASE

CROSS-REFERENCE TO PARENT APPLICATION

This patent application is a continuation of U.S. Ser. No. 11/972,848 filed Jan. 11, 2008, which is incorporated herein by reference.

BACKGROUND OF THE INVENTION

1. Technical Field

This invention generally relates to query optimizers in a computer database system, and more specifically relates to improving a database query that searches for a character string in a computer database.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language is used to specify a query with parameters that determine which data is retrieved from a database.

Optimization and execution of a database query can be a resource-intensive and time-consuming process. Further, the larger the database, the longer the time needed to execute the query. In order to prevent an excessive drain on resources, many databases are configured with query optimizers. A query optimizer analyzes an SQL query and determines more efficient ways to execute the query.

Some SQL queries require scanning sequentially through a database record for matching string of data. For example, the query may scan for a piece of text or small character string in a document or database record that comprises a large string of text. These queries are typically quite inefficient in identifying the needed text from the database record. Often no other predicate values exist to eliminate records from the search, so a table scan is performed to search for the needed text. When each record in the table is scanned, each field or record in the table is searched from the beginning to the end for the text string being sought. Searching for text string in a database in this manner is inefficient.

In query optimizers in the prior art, sequentially searching for a string in a database record is done without regard to the starting position of the search. Without a way to more effectively search for a string in a database, computer systems will continue to suffer from inefficient searches and their waste of system resources.

DISCLOSURE OF INVENTION

An apparatus and method is described for a query optimizer to improve string searches in a computer database that sequentially search for a string in a database record. The query optimizer optimizes the query to search records of a database from a specified start position other than the beginning of the record. The specified start position of the search may be determined by from historical information stored from previous searches. Alternatively, the query optimizer determines the specified start position of the search based on an overriding starting position provided by a system administrator. The query optimizer may also direct that the database record be reorganized to more efficiently search for strings in the record.

The disclosed embodiments are directed to a generic computer architecture and thus could be implemented on any computer database system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The disclosure and claims herein are directed to query optimizers that optimize database queries to a computer database. For those not familiar with databases, queries, or query optimizers, this Overview section will provide background information that will help to understand these concepts.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces a mini access plan to execute the query in the database. The mini-plan may be stored in a mini-plan cache for use with subsequent queries that use the same mini-plan. In the prior art, a tool known as a query optimizer evaluates expressions in a query and optimizes the query and the access plan to access the database.

A query sometimes requires a search for a text string in a database record that essentially consists of a long string of text as discussed in the background section above. In SQL, the "Like" clause is often used to perform this type of text string search. For example, consider the following query:
select * from file1 where field1 like '%string1%'

Figure 2:
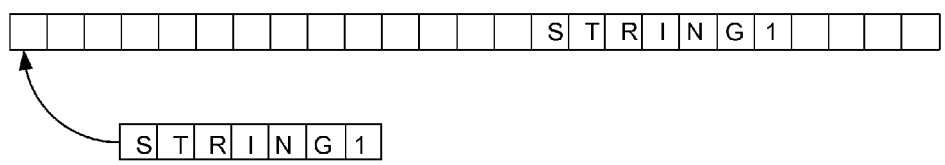
FIG. 2 is a block diagram of a string search according to the prior art.

This query searches for the occurrence of the text string "string1" in the database field "field1" located in the database file "file1". In the prior art, this query would begin searching at the beginning of "field1" 210 for the text string "string1" 220 as illustrated in FIG. 2. When the database field or record 210 is large, this prior art search method is very inefficient and may unnecessarily waste system resources to perform the query.

While each of the examples herein are in terms of a text string, other strings may also use the apparatus and methods described below. As used herein, the term string may refer to a text string, a hex string or a binary string that may occur somewhere in a database record of the same type.

2.0 Detailed Description

An apparatus and method is described for a query optimizer to improve string searches in a computer database. As described herein a query optimizer searches records of a database based on a specified starting position for the search other than the beginning of the record. The specified starting position may depend on historical information stored for previous searches and/or override positions determined by a system administrator.

Figure 1:
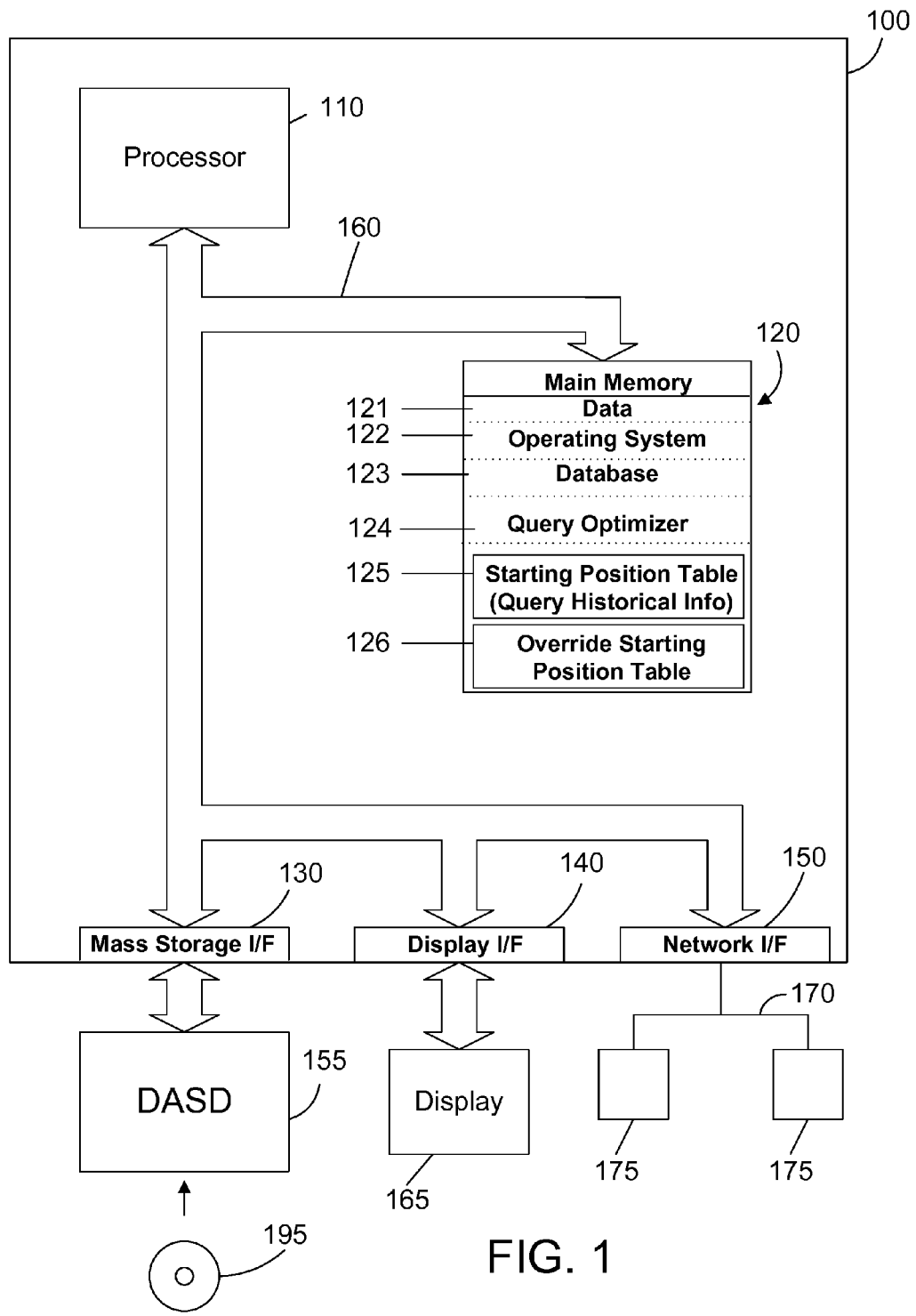
FIG. 1 is a block diagram of a computer system with a query optimizer as described herein.

Referring to FIG. 1, a computer system 100 is one suitable implementation of the apparatus and method described herein. Computer system 100 is an IBM eServer System i computer system. However, those skilled in the art will appreciate that the methods and apparatus described herein apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 contains data 121, an operating system 122, a database 123, a query optimizer 124, a starting position table 125, and an override starting position table 126. Data 121 represents any data that serves as input to or output from any program in computer system 100. Operating system 122 is a multitasking operating system known in the industry as i5/OS; however, those skilled in the art will appreciate that the spirit and scope of this disclosure and claims are not limited to any one operating system. Database 123 is any suitable database that includes tables, whether currently known or developed in the future. A query optimizer 124 is used to execute queries to the database 123. Note that query optimizer 124 is shown separate from database 123, but could also be implemented in database 123. The main memory 120 includes a starting position table 125 that holds historical information derived from previously run queries to determine an optimal starting position to search the database for a string. Alternatively, the query optimizer may use an override starting position table 126 to allow a system administrator to set starting positions for text string searches in queries. The starting position table 125 and override starting position table 126 may be stored as part of the query optimizer 124 or part of the database 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query optimizer 124, starting position table 125 and override starting position table 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the improved query optimizer described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that the improved query optimizer described herein applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The improved query optimizer described herein applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the improved query optimizer has been and will continue to be described in the context of a fully functional computer system, those skilled in the art will appreciate that the query optimizer described herein is capable of being distributed as an article of manufacture in a variety of forms, and that the claims extend to all types of computer-readable media used to actually carry out the distribution. Examples of suitable computer-readable media include: recordable media such as floppy disks and CD-RW (e.g., 195 of FIG. 1).

Figure 3:
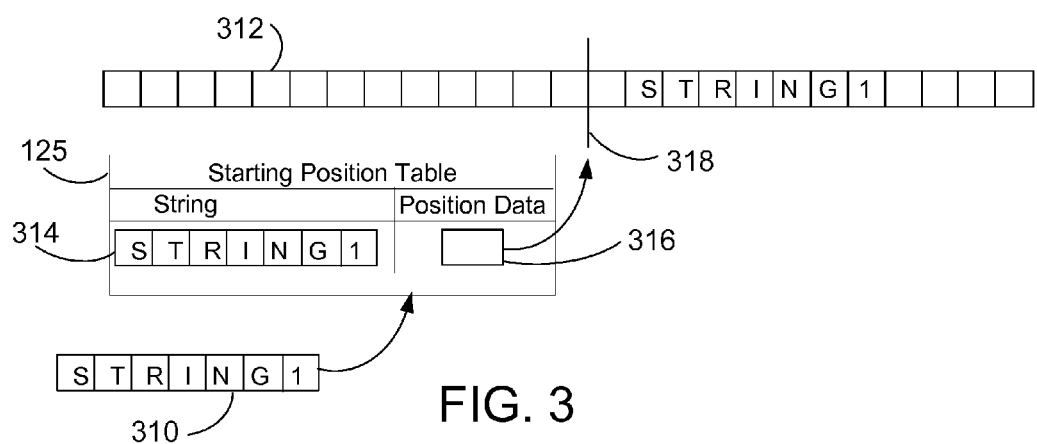
FIG. 3 is a block diagram of a string search that considers the starting position of the search other than the beginning of the record.

FIG. 3 illustrates an example of an improved string search in a computer database. This example uses the following query:

select * from file1 where field1 like '%string1%'

This query searches for the occurrence of the text string "string1" 310 in the database field "field1" 312 located in the database file "file1" (not shown). Using the methods described herein, the query optimizer recognizes the "Like" clause and searches in the starting position table 125 for a record or a combination of records that can provide an improved starting point for searching the database. In this case, a record is found in the starting position table 125 with the same text string "string1" 314 and corresponding position data 316. The position data is historical information from previous searches and is described further below. In the simplest case, the position data is the position of the string found in the previous search. The position may be represented as an offset into the record or string of the position the text string is found. The optimizer uses the information from the record in the starting position table 125 to determine a starting position 318 to begin searching the "field1" 312 for the text string "string1" 312 as illustrated in FIG. 3. If the text string is not found, the search will continue at the beginning of the field to finish searching the entire field.

Figures 4, 5:
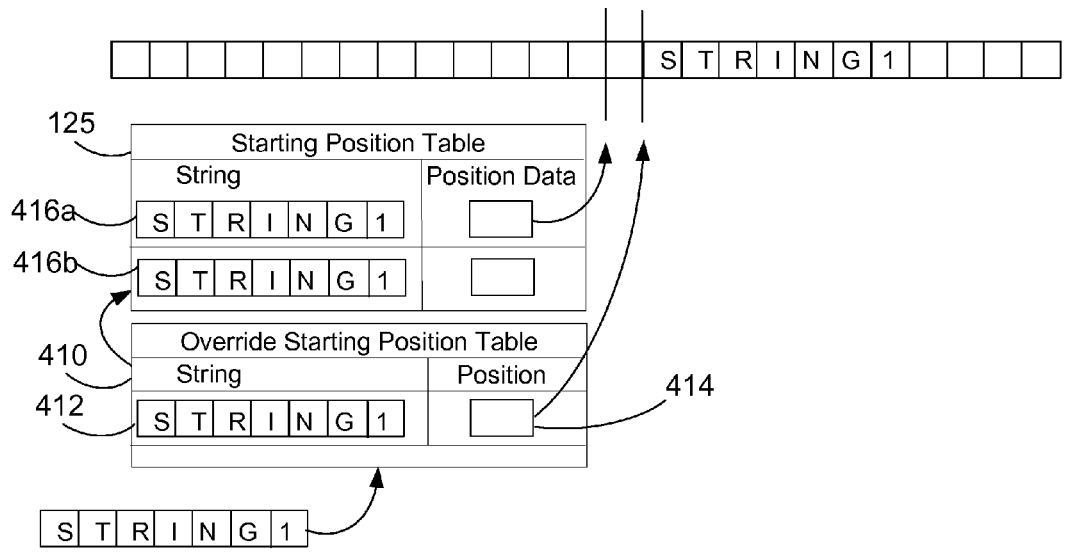
FIG. 4 is another block diagram of a string search that considers the starting position of the search.
FIG. 5 is a block diagram that represents records of historical information that are collected by the query optimizer to determine the starting position of the search.

FIG. 4 illustrates another example of an improved string search in a computer database. This example again uses the same query as described above. The example in FIG. 4 includes an override starting position table 410 that is used to determine a starting position 412. The overriding starting position table 410 has text strings 412 and corresponding starting positions 414 that are set by a user or system administrator. When there is a matching record in the overriding starting position table 410, the overriding starting position is used instead of accessing the starting position table 125. When there is no overriding starting position for a text string, then the starting position table is searched for a matching record to determine a starting position as described above with reference to FIG. 3, or as described below. A graphical user interface (GUI) can be employed to allow a user or system administrator to select a starting position for one or more selected text strings that are then stored in the override starting position table 410.

Again referring to FIG. 4, a combination of records in the starting position table 125 is used to determine a starting position. When there is more than one record in the starting position table that matches the query 416a, 416b, the records can be combined in different ways to determine an appropriate starting position for the search. The starting position could be determined by finding the average starting position of the historical queries in the starting position table and then using the average starting position or some geometrical derivative of the average. Alternatively, the starting position could be set to a minimum value such that the start position in the table will cover 90%, or some other percentage, of the historical matches in the starting position table. Where other information about prior searches is stored as described below, more optimal starting positions may be determined. For example, a more optimal starting position percentage may determined by investigating the stored information about where prior searches started compared to where the data was actually found. Stored information about the prior searches is described more below.

FIG. 5 illustrates an example of a starting position table used for improving string searches in a computer database. The starting position table 125 contains a number of records indicated as records 510A through 510N. Each record has a number of fields that hold data for that record. The data fields in the starting position table includes the text string of the SQL query, the starting position used to search for the string in the data record, the position the text string was found, the job ID, the application ID, the job priority, the user ID, the predicate value used to search the starting position table, and the time stamp when the record was created.

Figure 6:
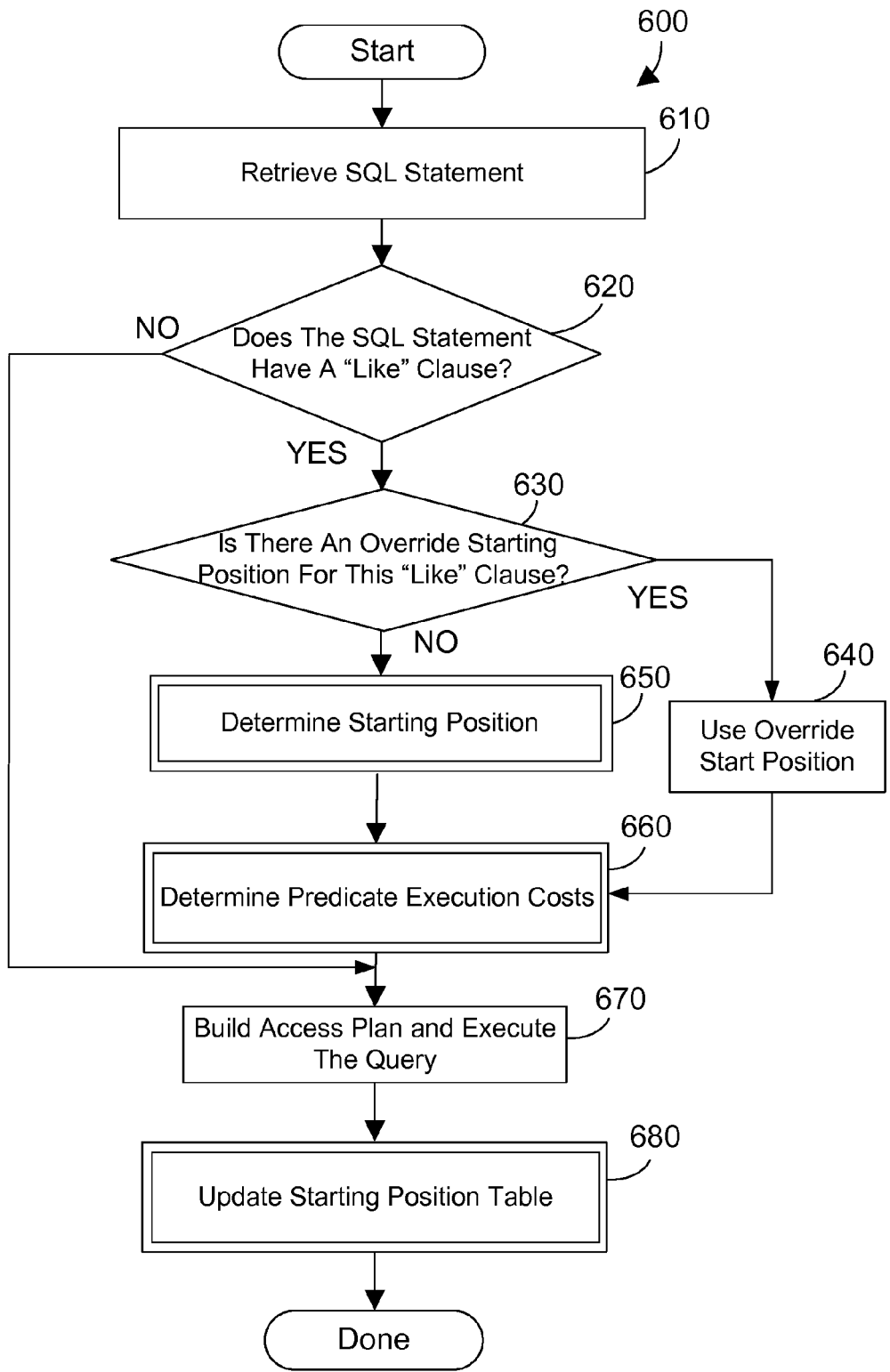
FIG. 6 is a method flow diagram for a query optimizer described herein.

The information stored from prior searches as shown in FIG. 5 may be used to optimize the starting position of string searches. For example, many applications will always be looking for a given part of a stored document, thus historical data tied to the application id would be useful to optimize the starting position. Similarly, other fields being stored in the historical table could be used to optimize the starting position. As described above, a combination of data fields in the starting position table 125 can also be used to define a starting position. The combination of the userid and the application may be valuable to define the starting position. For example, when userid "Doctor" runs application XYZ a search is likely to be looking for something at the beginning of the record. In contrast, when userid "Nurse" runs application XYZ, a search is more likely to be looking for something else near the end of the record, even though the same application is searching the same XML document or record stored in the database.

Where the records are large fields that really contain documents or other entities that make it natural for them to be subdivided into parts, the part of the document where the search string is found could also be used to determine where to search. In this case, identifiers of the document parts may also be stored in the starting position table. Similarly, other data could be stored in the starting position table to assist in determining a starting position as described and claimed herein. FIG. 6 illustrates a method 600 for a query optimizer to perform an improved string search in a computer database. This method operates on a computer system 100 described above with reference to FIG. 1. The method 600 begins by retrieving an SQL statement (step 610) and parsing the statement to determine if the SQL statement contains a "Like" clause (step 620). If the query statement does not contain a "Like" clause (step 620=no) then skip to step 670. If the query statement does contain a "Like" clause (step 620=yes) then determine a starting position to start searching the target data structure for the needed text (step 650) and then determine the cost to execute this predicate with the "Like" clause (step 660). An access plan is then prepared and the query is executed in the manner known in the prior art (step 670). Data from execution of the query is used to update the starting position table (step 680) and the method is then done.

Figure 7:
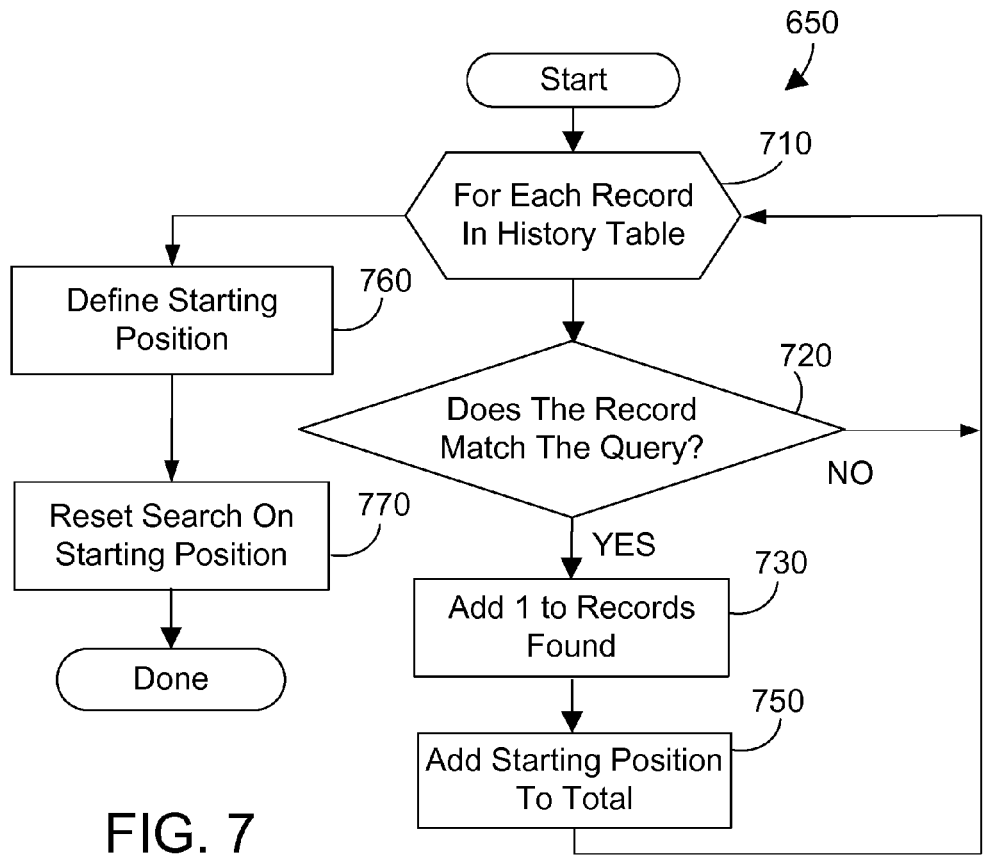
FIG. 7 is a method flow diagram that represents one possible implementation for step 650 shown in FIG. 6.

The method 650 illustrated in FIG. 7 represents one suitable implementation for the step 650 described above with reference to FIG. 6. According to method 650, each record in the history table is processed to determine an appropriate starting point in the text string search (step 710). If the record does not matches the query (step 720=no) then skip back to step 710 and use the next record. If the record does match the query (step 720=yes) then add 1 to records found (step 730) and add the starting position to the total (step 750). When all the records have been processed (step 710 is complete) then determine the starting position (step 760) and then reset the starting position to the determined starting position (step 770) and return to method 600.

Figure 8:
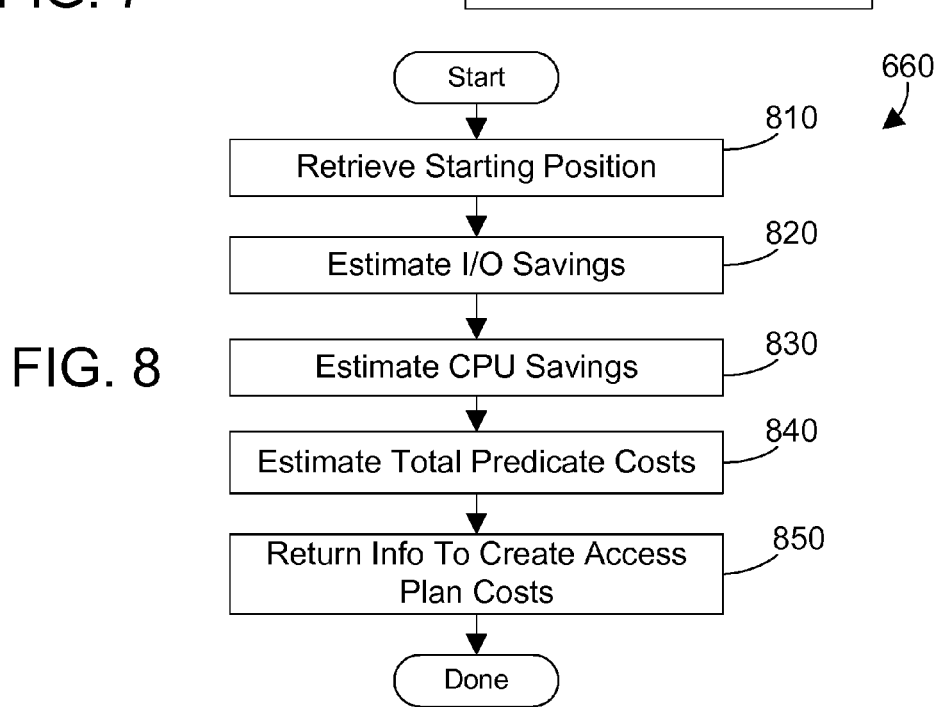
FIG. 8 is a method flow diagram that represents one possible implementation for step 660 shown in FIG. 6.

FIG. 8 illustrates method 660 that determines the costs to execute a query with the predicate containing the "Like" clause with the improved starting position determined in step 650. Method 660 is one suitable implementation for step 660 in FIG. 6. For method 660 in FIG. 8, first retrieve the starting position determined in method 650 described above (step 810). Using the new starting position, estimate the I/O savings (step 820), estimate the CPU savings (step 830) and estimate the total predicate costs to execute this portion of the query (step 840), and then return to step 670 in method 600 to execute the query.

Figure 9:
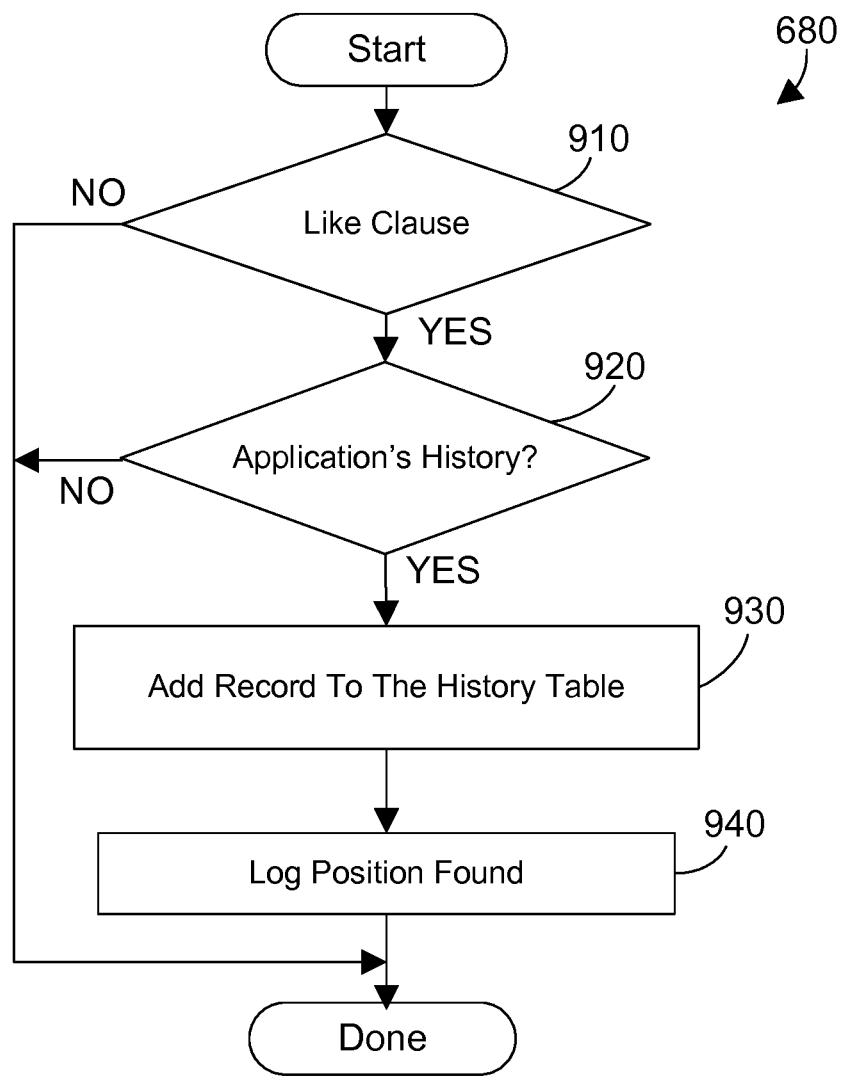
FIG. 9 is a method flow diagram that represents one possible implementation for step 680 shown in FIG. 6.

FIG. 9 illustrates a method 680 to update the starting position table each time a query does a text string search to provide historical information for future searches (125 in FIG. 1 and in FIG. 5). Method 680 represents one suitable implementation for the step 680 described above with reference to FIG. 6. According to method 680, each query that executes is processed to update the starting position table. Method 680 fist determines if the query contains a "Like" clause (step 910). If the query contains a "Like" clause (step 910=yes) then the application's history is checked to determine whether the application is set up for storing historical data for query optimization (step 920). If the application's history is not set up for storing historical data (step 920=no) then the method is done. If the application's history is set up for storing historical data (step 920=yes) then add the record to the starting position table (step 930) and log the position found in the new record of the starting position table (step 940). The method is then done.

In some database files, variable length fields may be located on multiple memory pages. When the data must be searched for a string, multiple pages must be read to perform the search. The prior search data described above can be used to reorganize the data in these type of fields to bring in fewer pages from memory to perform the string search. The historical records can be read and a reorganization can be flagged when the historical records indicated this situation. A flagged file can then be reorganized to reduce the number of pages to be read for the search by moving the target data containing the search string closer to the beginning of the record. The reorganization can be accomplished by a systems administrator or by a tool designed to perform the reorganization.

Figure 10:
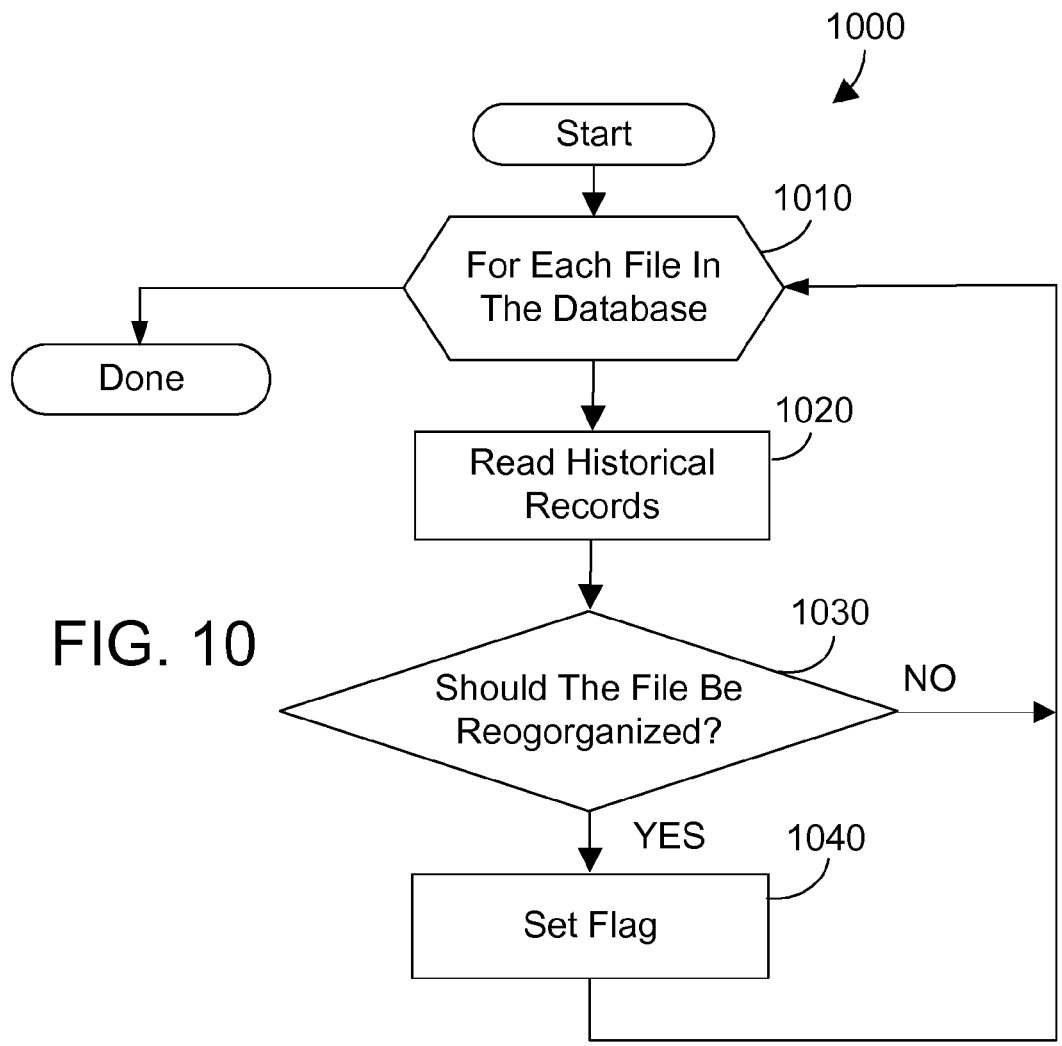
FIG. 10 is a method flow diagram for reorganizing a data record to optimize the search for one or more particular strings.

FIG. 10 illustrates a method 1000 for a query optimizer to perform an improved string search in a computer database. This method uses the historical information gathered into the starting position table to determine when a table could be reorganized to improve searching for text strings in the table. The method 1000 processes each file in the database (step 1010) to determine if the file is suitable for reorganization. Each of the historical records is read (step 1020) to determine if the file should be reorganized based on the historical records. Where the file is suitable to be reorganized (step 1030=yes), a flag is set (step 1040) to indicate the file can be reorganized to optimize string searches of the file. Where the file should not be reorganized (step 1030=no) then the method looks at the next file (step 1010) until all the files are checked and the method is then done.

The disclosure herein describes a method and apparatus for a query optimizer to improve string searches in a computer database. As described herein a query optimizer searches records of a database based on a specified starting position for the search other than the beginning of the record to more effectively search for a text string in a database and thus conserve system resources. The specified starting position may depend on historical information stored for previous searches and/or override positions determined by a system administrator.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer implemented method for optimizing queries to data in a computer database comprising the steps of:
retrieving a query to the computer database;
parsing the query for a clause that requires searching for a string in a database record;
when there is a clause that requires searching for a text string, optimizing the query by determining a starting position other than a beginning position of the database record, wherein the determined starting position in the database record is based on historical records of previous queries in a starting position table and the starting position for the search is based on a position where previous queries found the string in a predetermined number of the records that match the query;
updating the starting position table to provide historical information for future searches; and
executing the query to search for the text string at the determined starting position.

2. The computer implemented method of claim 1 wherein the determined starting position in the database record is based on an override starting position table containing start positions specified by a system administrator.

3. The computer implemented method of claim 1 wherein the step of parsing the query for a clause that requires searching for a text string looks for a "Like" clause in the query.

4. The computer implemented method of claim 1 wherein the step of determining a starting position to search for the string in the database record based on records of similar historical queries comprises the steps of:
searching each record of the starting position table for records that matches the query; and
defining a starting position to search the record based on the position where previous queries found the string in at least 90 percent of the records that match the query.

5. The computer implemented method of claim 1 further comprising the steps of:
reading the historical records;
for each file in the database determining when the file should be reorganized to place data containing the search string closer to the beginning of the record; and
setting a flag to indicate the file should be reorganized.

6. A computer implemented method for optimizing queries to data in a computer database comprising the steps of:
retrieving a query to the computer database;
parsing the query for a clause that requires searching for a string in a database record;
when there is a clause that requires searching for a text string, optimizing the query by determining a starting position other than a beginning position of the database record, wherein the determined starting position in the database record is based on historical records of previous queries in a starting position table and the starting position for the search is based on a position where previous queries found the string in a predetermined number of the records that match the query;

wherein the determined starting position in the database record is further based on an override starting position table containing start positions specified by a system administrator;

updating the starting position table with each query that does a string search to provide historical information for future searches; and executing the query to search for the text string at the determined starting position.

7. The computer implemented method of claim 6 wherein the step of parsing the query for a clause that requires searching for a text string looks for a "Like" clause in the query.

8. The computer implemented method of claim 6 wherein the step of determining a starting position to search for the string in the database record based on records of similar historical queries comprises the steps of:

searching each record of the starting position table for records that matches the query; and defining a starting position to search the record based on the position where previous queries found the string in at least 90 percent of the records that match the query.

9. The computer implemented method of claim 6 further comprising the steps of:

reading the historical records;

for each file in the database determining when the file should be reorganized to place data containing the search string closer to the beginning of the record; and setting a flag to indicate the file should be reorganized.

* * * * *